(12) United States Patent
Stillman

(10) Patent No.: US 7,892,586 B2
(45) Date of Patent: Feb. 22, 2011

(54) WATER CONTAINING SOLUBLE FIBER

(76) Inventor: Suzanne Jaffe Stillman, 1712 S. Barrington Ave. Ste 4, Los Angeles, CA (US) 90025

( * ) Notice: Subject to any disclaimer, the term of this patent is extended or adjusted under 35 U.S.C. 154(b) by 744 days.

(21) Appl. No.: 11/689,447

(22) Filed: Mar. 21, 2007

(65) Prior Publication Data

US 2007/0160735 A1  Jul. 12, 2007

Related U.S. Application Data

(63) Continuation-in-part of application No. 10/204,572, filed as application No. PCT/US01/05630 on Feb. 22, 2001, now Pat. No. 7,238,380.

(51) Int. Cl.
*A23L 1/308* (2006.01)
(52) U.S. Cl. ............... 426/66; 426/74; 426/615; 426/654
(58) Field of Classification Search ............ 426/74, 426/615, 66, 654
See application file for complete search history.

(56) References Cited

U.S. PATENT DOCUMENTS

| | | |
|---|---|---|
| 2,224,252 A | 12/1940 | Callaway |
| 3,009,859 A | 11/1961 | Laborit et al. |
| 3,114,641 A | 12/1963 | Sperti et al. |
| 3,227,562 A | 1/1966 | Houghtaling et al. |
| 3,337,404 A | 8/1967 | Polli et al. |
| 3,564,740 A | 2/1971 | Calfee |
| 3,908,024 A | 9/1975 | Wankler |
| 3,939,283 A | 2/1976 | Billington |
| 4,034,493 A | 7/1977 | Bail |
| 4,042,684 A | 8/1977 | Kahm |
| 4,154,814 A | 5/1979 | Hand et al. |
| 4,167,587 A | 9/1979 | Danforth |
| 4,187,194 A | 2/1980 | Wellman et al. |
| 4,211,668 A | 7/1980 | Tate |
| 4,217,370 A | 8/1980 | Rawlings et al. |
| 4,283,432 A | 8/1981 | Mitchell et al. |
| 4,309,417 A | 1/1982 | Staples |
| 4,315,513 A | 2/1982 | Nawash et al. |
| 4,393,873 A | 7/1983 | Nawash et al. |
| 4,444,761 A | 4/1984 | Spiller |
| 4,447,532 A | 5/1984 | Coker et al. |
| 4,448,770 A | 5/1984 | Epting, Jr. |
| 4,497,793 A | 2/1985 | Simkin |
| 4,689,235 A | 8/1987 | Barnes et al. |
| 4,711,784 A | 12/1987 | Yang |
| 4,738,856 A | 4/1988 | Clark |
| 4,749,575 A | 6/1988 | Rotman |
| 4,777,042 A | 10/1988 | Toda et al. |
| 4,778,677 A | 10/1988 | Ebbesen |
| 4,784,861 A | 11/1988 | Gori |
| 4,834,990 A | 5/1989 | Amer |
| 4,849,222 A | 7/1989 | Broaddus |
| 4,911,889 A | 3/1990 | Leland et al. |
| 4,953,572 A | 9/1990 | Rose et al. |
| 4,988,530 A | 1/1991 | Hooersten et al. |
| 4,996,063 A | 2/1991 | Inglett |
| 4,998,530 A | 3/1991 | Donmichael |
| 5,002,934 A | 3/1991 | Norton et al. |
| 5,009,819 A | 4/1991 | Popescu et al. |
| 5,019,400 A | 5/1991 | Gombotz et al. |
| 5,019,594 A | 5/1991 | Wurtman et al. |
| 5,024,842 A | 6/1991 | Edgren et al. |
| 5,032,411 A | 7/1991 | Stray-Gundersen |
| 5,051,261 A | 9/1991 | McGinity et al. |
| 5,055,460 A | 10/1991 | Friedlander |
| 5,077,057 A | 12/1991 | Szoka, Jr. |
| 5,082,673 A | 1/1992 | Inglett |
| 5,108,774 A | 4/1992 | Mills et al. |
| 5,126,332 A | 6/1992 | Ohta et al. |
| 5,149,541 A | 9/1992 | Leis, Jr. et al. |
| 5,162,128 A | 11/1992 | Mills et al. |
| 5,178,896 A | 1/1993 | Langner |
| 5,209,978 A | 5/1993 | Kosaka et al. |
| 5,215,750 A | 6/1993 | Keane, II |
| 5,219,570 A | 6/1993 | Barbera |
| 5,223,268 A | 6/1993 | Stetski et al. |
| 5,225,219 A | 7/1993 | Inglett |
| 5,229,117 A | 7/1993 | Leland et al. |
| 5,229,172 A | 7/1993 | Cahalan et al. |

(Continued)

FOREIGN PATENT DOCUMENTS

FR      2586532      3/1987

(Continued)

OTHER PUBLICATIONS

Cordoba et al. "Chondroitin sulfate and other sulfate containing chondroprotective agents . . . ", Ostheoarthritis and Cartilage, 2003, v. 11 p. 228.

(Continued)

*Primary Examiner*—Helen F Pratt
(74) *Attorney, Agent, or Firm*—Woodcock Washburn LLP

(57) ABSTRACT

Fiber-water is a composition containing water and soluble fiber that tasted, looks smells and feels like pure water. The RDA of fiber is contained within the recommended 64 ounces of daily water intake. The water composition is supplemented with an acidulate that extends it's shelf life. Optionally, the composition also includes minerals. The RDA of minerals is contained in the recommended 64 ounces of fiber water.

17 Claims, No Drawings

U.S. PATENT DOCUMENTS

| | | | |
|---|---|---|---|
| 5,260,279 A | 11/1993 | Greenberg | |
| 5,260,873 A | 11/1993 | Hishinuma | |
| 5,270,297 A | 12/1993 | Paul et al. | |
| 5,273,754 A | 12/1993 | Mann | |
| 5,294,458 A | 3/1994 | Fujimori | |
| 5,294,606 A | 3/1994 | Hastings | |
| 5,300,310 A | 4/1994 | Elsen | |
| 5,344,824 A | 9/1994 | Ohkuma et al. | |
| 5,358,729 A | 10/1994 | Ohkuma et al. | |
| 5,364,652 A | 11/1994 | Ohkuma et al. | |
| 5,374,444 A | 12/1994 | Langner | |
| 5,378,474 A | 1/1995 | Morella et al. | |
| 5,380,717 A | 1/1995 | Ohkuma et al. | |
| 5,397,786 A | 3/1995 | Simone | |
| 5,405,836 A | 4/1995 | Richar et al. | |
| 5,422,352 A | 6/1995 | Astrup | |
| 5,430,141 A | 7/1995 | Ohkuma et al. | |
| 5,447,730 A | 9/1995 | Greenleaf | |
| 5,456,985 A | 10/1995 | Zgoulli et al. | |
| 5,458,893 A | 10/1995 | Smith | |
| 5,472,732 A | 12/1995 | Ohkuma et al. | |
| 5,505,981 A | 4/1996 | Wakabayashi et al. | |
| 5,516,535 A | 5/1996 | Heckert et al. | |
| 5,519,011 A | 5/1996 | Wakabayashi et al. | |
| 5,531,734 A | 7/1996 | Geckle et al. | |
| 5,533,973 A | 7/1996 | Piontek et al. | |
| 5,543,405 A | 8/1996 | Keown et al. | |
| 5,550,113 A | 8/1996 | Mann | |
| 5,558,897 A | 9/1996 | Goldman | |
| 5,567,424 A | 10/1996 | Hastings | |
| 5,571,441 A | 11/1996 | Andon et al. | |
| 5,587,197 A | 12/1996 | Meada et al. | |
| 5,597,604 A | 1/1997 | Chalupa et al. | |
| 5,605,697 A | 2/1997 | Asano et al. | |
| 5,612,026 A | 3/1997 | Diehl | |
| 5,620,873 A | 4/1997 | Ohkuma et al. | |
| 5,653,996 A | 8/1997 | Hsu | |
| 5,672,301 A | 9/1997 | Orly et al. | |
| 5,681,606 A | 10/1997 | Hutchison et al. | |
| 5,698,437 A | 12/1997 | Matsuda et al. | |
| 5,700,484 A | 12/1997 | Chauffard et al. | |
| 5,721,345 A | 2/1998 | Roberfroid et al. | |
| 5,753,295 A | 5/1998 | Goldman | |
| 5,755,688 A | 5/1998 | Plontek et al. | |
| 5,776,524 A | 7/1998 | Reinhart | |
| 5,780,060 A | 7/1998 | Levy et al. | |
| 5,792,754 A | 8/1998 | Green et al. | |
| 5,810,018 A | 9/1998 | Monte | |
| 5,824,353 A | 10/1998 | Tsunoda et al. | |
| 5,851,578 A * | 12/1998 | Gandhi | 426/590 |
| 5,880,109 A | 3/1999 | Nakamura et al. | |
| 5,891,465 A | 4/1999 | Keller et al. | |
| 5,900,251 A | 5/1999 | Raissen | |
| 5,904,851 A | 5/1999 | Taylor et al. | |
| 5,922,346 A | 7/1999 | Hersh | |
| 5,922,350 A | 7/1999 | Janoff et al. | |
| 5,935,826 A | 8/1999 | Blue et al. | |
| 5,958,456 A | 9/1999 | Baichwal et al. | |
| 5,958,491 A | 9/1999 | Knueven | |
| 5,958,497 A | 9/1999 | Grimm et al. | |
| 5,962,015 A | 10/1999 | Delrieu et al. | |
| 5,968,365 A | 10/1999 | Laurenzo et al. | |
| 5,968,569 A | 10/1999 | Cavadini et al. | |
| 5,972,415 A | 10/1999 | Brassart et al. | |
| 5,976,603 A | 11/1999 | Kota et al. | |
| 5,977,175 A | 11/1999 | Lin | |
| 5,985,282 A | 11/1999 | Haveson | |
| 5,989,574 A | 11/1999 | Slavin | |
| 5,993,880 A | 11/1999 | Frost et al. | |
| 5,997,917 A | 12/1999 | Uchida et al. | |
| 6,001,554 A | 12/1999 | Boyle et al. | |
| 6,004,610 A | 12/1999 | Wang et al. | |
| 6,007,838 A | 12/1999 | Alving et al. | |
| 6,007,872 A | 12/1999 | Lindhe et al. | |
| 6,013,622 A | 1/2000 | Bruno et al. | |
| 6,017,550 A | 1/2000 | Berk et al. | |
| 6,020,002 A | 2/2000 | Myers et al. | |
| 6,020,016 A | 2/2000 | Castleberry | |
| 6,022,500 A | 2/2000 | John et al. | |
| 6,022,525 A | 2/2000 | Sutton et al. | |
| 6,030,605 A | 2/2000 | D'Ameila et al. | |
| 6,033,713 A | 3/2000 | Sheldon | |
| 6,033,888 A | 3/2000 | Batich et al. | |
| 6,039,952 A | 3/2000 | Sunvold et al. | |
| 6,042,854 A | 3/2000 | Morris et al. | |
| 6,077,504 A | 6/2000 | Vesley et al. | |
| 6,077,872 A | 6/2000 | Yu et al. | |
| 6,102,224 A | 8/2000 | Sun et al. | |
| 6,120,803 A | 9/2000 | Wong et al. | |
| 6,133,323 A | 10/2000 | Hayek | |
| 6,180,099 B1 | 1/2001 | Paul | |
| 6,180,131 B1 | 1/2001 | Sunvold et al. | |
| 6,190,591 B1 | 2/2001 | Van Lengerich | |
| 6,193,999 B1 | 2/2001 | Gennadios | |
| 6,204,291 B1 | 3/2001 | Sunvold et al. | |
| 6,235,320 B1 | 5/2001 | Daravingas et al. | |
| 6,248,390 B1 | 6/2001 | Stillman | |
| 6,261,589 B1 | 7/2001 | Pearson et al. | |
| 6,265,450 B1 | 7/2001 | Asami et al. | |
| 6,296,892 B1 | 10/2001 | Elseviers et al. | |
| 6,328,967 B1 | 12/2001 | Rivera | |
| 6,355,274 B1 | 3/2002 | Dartey et al. | |
| 6,365,209 B2 | 4/2002 | Cherukuri | |
| 6,368,629 B1 | 4/2002 | Watanabe et al. | |
| 6,368,633 B1 | 4/2002 | Lou et al. | |
| 6,383,534 B1 | 5/2002 | Dyrr et al. | |
| 6,399,090 B1 | 6/2002 | Shehadeh | |
| 6,399,124 B1 | 6/2002 | Lessens et al. | |
| 6,403,657 B1 | 6/2002 | Hinz | |
| 6,406,730 B1 | 6/2002 | Banyard | |
| 6,410,061 B1 | 6/2002 | Morre et al. | |
| 6,410,521 B1 | 6/2002 | Mundy et al. | |
| 6,410,522 B1 | 6/2002 | Ruenberg | |
| 6,410,685 B1 | 6/2002 | Masuyama et al. | |
| 6,413,558 B1 | 7/2002 | Weber et al. | |
| 6,416,800 B1 | 7/2002 | Weber et al. | |
| 6,416,806 B1 | 7/2002 | Zhou | |
| 6,420,350 B1 | 7/2002 | Fleischner | |
| 6,436,453 B1 | 8/2002 | Van Lengerich et al. | |
| 6,468,568 B1 | 10/2002 | Leusner et al. | |
| 6,500,463 B1 | 12/2002 | Van Lengerich | |
| 6,531,156 B1 | 3/2003 | Clark et al. | |
| 6,544,568 B2 | 4/2003 | La Droitte et al. | |
| 6,558,718 B1 | 5/2003 | Evenson et al. | |
| 6,620,445 B1 | 9/2003 | Knueven | |
| 6,723,358 B1 | 4/2004 | Van Lengerich | |
| 6,758,715 B2 | 7/2004 | Banks | |
| 7,115,297 B2 | 10/2006 | Stillman | |
| 7,238,380 B2 | 7/2007 | Stillman | |
| 2005/0211768 A1 | 9/2005 | Stillman | |
| 2007/0009576 A1 | 1/2007 | Stillman | |
| 2008/0014327 A1 | 1/2008 | Stillman | |
| 2009/0232961 A1* | 9/2009 | Ichihara et al. | 426/661 |

FOREIGN PATENT DOCUMENTS

| | | |
|---|---|---|
| JP | 1009520 | 1/1989 |
| JP | H02-154673 A1 | 6/1990 |
| JP | 03-201497 | 7/1991 |
| JP | 04-240994 | 9/1992 |
| JP | 04-311378 | 11/1992 |
| JP | H5-17503 A1 | 1/1993 |
| JP | 6100442 | 4/1994 |
| JP | H06-90703 A1 | 4/1994 |

| | | |
|---|---|---|
| JP | 8275752 | 10/1996 |
| JP | 9020660 | 1/1997 |
| JP | 09-245492 | 10/1997 |
| JP | 63-306009 | 5/1998 |
| JP | 11-75777 A1 | 3/1999 |
| JP | 11-298103 | 10/1999 |
| JP | 11-512604 | 11/1999 |
| JP | 2000-232855 A1 | 8/2000 |
| JP | 01-509007 | 7/2001 |
| WO | WO 97/11614 A1 | 4/1997 |
| WO | WO 98/19564 | 5/1998 |
| WO | WO 9838223 A1 | 9/1998 |
| WO | WO 01/62108 | 8/2001 |
| WO | WO 01/70591 A1 | 9/2001 |

OTHER PUBLICATIONS

Markovich, "Physiological Roles and Regulation of Mammalian Sulfate Transporters", Physiological Reviews, 2001 v. 81 No. p. 1499.
Hoffer et al. "Sulfate could mediate the therapeutic effect of glucosamine sulfate", Metabolism, 2001 v. 50 p. 767.
Hannan, "Effect of dietary protein on bone loss in elderly men and women . . . ". J. of Bone and Mineral Research, 2000, v. 15, p. 2504.
"Total Dissolved Solids in Drinking-Water", Guidelines for Drinking-Water Quality, 2nd Edition, vol. 2, Health Criteria and Other Supporting Information, World Health Organization, Geneva, 1996.
Benefiber Product Label (1999).
BetaCote™ Technical Information, Lycored Natural Products Industries, accessed via the internet on Sep. 18, 2009 at URL <http://www.lycored.com/web/content/betacote-tech.asp.
Brochure by Matsutani America, Inc., "Matsutani's Products & Their Functionalities", May 1999.
Brochure by Matsutani Chemical Industry, "Fibersol-2-Physiological Attributes", Feb. 16, 1999.
Brochures by Imperial Sensus LLC, "Facts About Insulin/FOS, Fruitafit Nutritional Information", What is Fruitafit?.
Buckton Scott Group Circular, "BetaCote 20VB", 1 page, May 6, 2004.
Buskirk et al., "Body Fluid Balance" CRC Press, Jul. 16, 1996, 1-17.
Chemical Database: Picloram, EnvironmentalChemistry.com, http://www.environmentalchemistry.com, Nov. 17, 2009, 1-3.
Deis, "Dietary Fiber: A Healthy Discussion", Food Product Design, Jan. 1999, 1-8.
Delta Communications Group, http://www.delta-comm.com, Nov. 17, 2009, 1 page.
Electronic Code of Federal Regulations, Title 21: Food and Drugs, Part 165.110 Bottled Water, Jul. 6, 2009.
Golay et al., "The effect of a liquid supplement containing guar gum and fructose on glucose tolerance in non-insulin-dependent diabetic patients", Nutrition, Metabolism & Cardiovascular Diseases, 1995, 5, 141-148.
Goldschlager Article from http://www.cockeyed.com/inside/goldschlager/goldschlager.html.
Greenleaf, "Problem: Thirst, Drinking Behavior and Involuntary Dehydration" Medicine and Science in Sports and Exercise, Jun. 1992, 24(6), 645-656.
Hara et al., Increases in Calcium Absorption With Ingestion of Soluble Dietary Fibre, Guar-Gum Hydrolysate, Depend on the Casecum in Partially Nephrectomized and Normal Rats, British Journal of Nutrition, Nov. 1996, 76(5), 773-784.
Homann et al., "Reduction in Diarrhea Incidence by Soluble Fiber in Patients Receiving Total or Supplemental Enteral Nutrition," J Parenter Enteral Nutr, Nov.-Dec. 1994, 18(6), 486-490.
http://diabetes.webmd.com/is-there-a-diabetes-cure (accessed Jan. 21, 2009).
Ide et al., "Hypolipidemic Effects of Guar Gum and It's Enzyme Hydrolysale in Rats Fed Highly Saturated Fat Diets", Annals of Nutrition and Metabolism , 1991, 35(1), 34-44 (Abstract Only).
Information Access Company, http://www.funduniverse.com, Company History, Nov. 17, 2009, 1-4.
International Search Report dated Jun. 4, 2001 for International Application No. PCT/US01/05630.

Kishimoto et al., "Effects of Intravenous Injection and Intraperitoneal Continual Administration of Sodium Propionate on Serum Cholesterol Levels in Rats", J. Nutri. Sci. Vitaminol., Feb. 1995, 41(1), 73-81.
Kishimoto, et al., "Hypocholesterol Effect of Dietary Fiber: Relation to Intestinal Fermentation and Bile Acid Excretion", J. Nutr. Sci. Vitaminol., Feb. 1995, 41(1), 151-161.
Klahorst, "Beverage Viscosity, Any Way You Like It!", Food Product Design, 2002, 7 pages.
Labell, F., "Functional Nutritional Fiber," Prepared Foods, 164(11):87 (1995).
Matsutani Chemical Industry Company, Ltd., "Fibersol 2".
Morrison & Boyd, "Acidity of Phenols", Organic Chemistry, 3rd Edition, Allyn and Bacon, Inc., Boston, 1973, 797-799.
Novartis Nutrition Corporation, "Benefiber Nutritional Data", Mar. 1999.
Novartis Nutrition Corporation, "Novartis Products", Jan. 31, 2000.
Nommura et al., "Effect of Dietary Fibers on the Deffusion of Glucose and Metal Ions through Cellulose Membrane", J. Japan Soc. Clin. Nutri., 1992, (13), 141-147.
Ohkuma et al., "Pyrolysis of Starch and Its Digestibility by Enzymes-Characterization of Indigestibility Dextrin-", Matsutani Chemical Research Laboratories, Denpun Kagaku, 1990, 37, 107-114, Figs.1-7, Tables 1-5.
Orbitz Article from http://www.bevnet.com/reviews/orbitz.
Pamphlet by Imperial Sensus, LLC, "Inulin, A Natural Non-Digestible Carbohydrate Having Healthy Influences For Preventing Disease—Occurrence, History, Preparation, Safety, Physiology and Related Health Implications", Version 23-10.29.99, 1997, 1998, 1999.
Porzio, "Flavor Encapsulation: A Convergence of Science and Art", Food Technology, Jul. 2004, 58(7), 40-49.
ProductScan Online, Asian Beverage Industry in which products are marketed as fruit and Fruit flavored drinks, 154 Full Reports, Dec. 30, 2002.
ProductScan Online, German Beverage Industry in which products are marketed as fruit and Fruit flavored drinks, 127 Full Reports, May 13, 2002.
ProductScan Online, Worldwide beverage Industry in which products are marketed as containing Fiber or as being a good source of Fiber, 137 Full Reports, Mar. 1, 2003.
Robinson et al., Effects of Dietary Arabinogalactan on Gastrointestinal and Bloodparameters in healthy human subjects, Journal of the American College of Nutrition, Aug. 2001, 20(4), 279-285.
Satouchi et al., "Effects of Indigestible Dextrin on Bowel Movements", Jpn. J. Nutrition, 1993, 31-37.
Shefer & Shefer, "Novel Encapsulation System Provides Controlled Release of Ingredients", Food Technology, Nov. 2003, 57(11), 40-42.
Slavin J. "Commercially Available Enteral Formula With Fiber and Bowel Function Measures", Nutrition in Clinical Practice, Dec. 1990, 5, 247-250.
Takahashi et al., "Effect of Liquid Diets with or without partially hydrolyzed Guar. Gum on Intestinal Microbial Flora and Function of Rats", Nutrition Research, Apr. 1995, 15(4), 527-536.
Takahashi et al., "Effect of Partially Hydrolyzed Guar Gum on Fecal Output in Human Volunteers", Nutrition Research, Jun. 1993, 13(6), 649-657.
Takahashi et al., "Influence of Intact and Partially Hydrolysed Guar Gum on Iron Utilization in Rats Fed On Iron-Deficient Diets", Comp. Biochem. Physical Part A, Sep. 1994, 109(1), 75-82.
Takahashi et al., "Influence of Partially Hydrolyzed Guar Gum on Constipation in Women", J Nutr Sci Vitaminol, Jun. 1994, 40(3), 251-259.
Tokunaga, K. "Effects of a Food for Specified Health Use (FOSHU) Which Contains Indigestible Dextrin as an Effective Ingredient on Glucose and Lipid Metabolism", J. Japan Diab. Soc., 1999, 61-65.
Ueda et al., "Effects of Indigestible Dextrin on Blood Glucose and Urine C-peptide Levels Following Sucrose Loading", J. Japan Diab. Soc., 1993, 36, 715-723.
Ueda, et al., "Effects of Ingestible Dextrin on Blood Glucose and Insulin Levels After Various Sugar Loads in Rats", Japan Nutritional Food Science, 1993, p. 46.

Vince, et al., "The effect of lactulose, pectin, arabinogalactan and cellulose on the production of organic acids and metabolism of ammonia by intestinal bacteria in a faecal incubation system", British Journal of Nutrition, Jan. 1990, 63(1), 17-26.

Wakabayashi et al., "Acute Toxicity and Mutagenicity Studies of Indigestible Dextrin, and Its Effect on Bowel Movement of the Rat", J. Food Hyg. Soc. Japan, 1992, 557-562.

Wakabayashi et al., "Effects of Indigestible Dextrin on Sugar Tolerance: II. Effect of Continuous Administration in Rats Fed on a High Sucrose Diet", J. Japan Diab. Soc., 1992, 873-880.

Wakabayashi, "Effects of Indigestible Dextrin on Glucose Tolerance in Rats", Journal of Endocrinology, Mar. 1995, 144(3), 533-538.

Wakabayashi, "The Effects of Indigestible Dextrin on Sugar Tolerance: I. Studies on Digestion-Absorption and Sugar Tolerance", Folia Endocrinol., Jun. 20, 1992, 68(6), 623-635.

Wakabayashi, "The Effects of Indigestible Dextrin on Sugar Tolerance: III. Improvement in Sugar Tolerance by Indigestible Dextrin on the Impaired Glucose Tolerance Model", Folia Endocrinol., Jun. 20, 1993, 69(6), 594-608.

Weaver et al., "Dietary Guar Gum Alters Colonic Microbial Fermentation in Azoxymetana-Treated Rats", J of Nutrition, Aug. 1996, 126(8), 1979-1991.

U.S. Appl. No. 90/009,253, filed Aug. 15, 2008, Reexamination of U.S. Patent No. 6,248,390.

U.S. Appl. No. 90/009,254, filed Aug. 19, 2008, Reexamination of U.S. Patent No. 7,238,380.

U.S. Appl. No. 90/009,255, filed Aug. 15, 2008, Reexamination of U.S. Patent No. 7,115,297.

Cho et al., "Application of Complex Carbohydrates to Food Product Fat Mimetics," Complex Carbohydrates in Food, 1999, pp. 411-429.

Dreher, "Food Sources and Uses of Dietary Fiber," Complex Carbohydrates in Food, 1999, pp. 327-341.

Evatt, "Bottled Water Flowing Off Shelves," Arkansas Democrat-Gazette, Dec. 6, 1999, 2 pages.

Kobayashi et al., "Nutritional and Physiological Functions of Indigestible Dextrin in the Upper Gastrointestinal Tract," Food Style 21, Nov. 1998, vol. 18, pp. 41-47.

Niness, "Inulin and Oligofructose: What Are They?," The Journal of Nutrition, 1999, vol. 129, pp. 1402S-1406S.

Takahashi et al., "Physiological Regulatory Effects of Indigestible Dextrin," Foods and Food Ingredients Journal of Japan, 1994, No. 161, pp. 13-26.

U.S. Appl. No. 95/001,456 filed Sep. 30, 2010, In The United States Patent and Trademark Office, In Re. U.S. Patent No. 7,238,380, filed Apr. 2, 2003, "Request For Inter Partes Reexamination, " dated Sep. 30, 2010.

U.S. Appl. No. 95/001,457 filed Sep. 30, 2010, In The United States Patent and Trademark Office, In Re. U.S. Patent No. 6,248,390, filed Feb 22, 2000, "Request For Inter Partes Reexamination," dated Sep. 30, 2010.

Wakabayashi, "Applications Toward Functional Indigestible Dextrin (Pinefiber, Fibersol 2) Food Products," Monthly Food and Chemicals, Jun. 1, 1997, vol. 6, pp. 49-54.

* cited by examiner

WATER CONTAINING SOLUBLE FIBER

CLAIM OF PRIORITY

This application is a continuation-in-part of my application Ser. No. 10/204,572, filed on Apr. 2, 2003 now U.S. Pat. No. 7,238,380, which is a national stage entry of my application PCT/US01/05630, filed on Feb. 22, 2001, which is based on my application Ser. No. 09/510,400 filed on Feb. 22, 2000, now a U.S. Pat. No. 6,248,390.

BACKGROUND OF THE INVENTION

The present application concerns generally components of the human diet and more specifically water and fiber.

One of the conundrums of human health is that dietary components, which may appear mundane, are actually incredibly essential. One such vital component that is frequently overlooked or given insufficient importance is water. Although water is not metabolized, it is absolutely essential for metabolism. A majority of the weight of the body is water which serves as the solvent for the chemical reactions of life. Water is the largest component of many living cells, and various nutrients needed for cellular growth and survival enter the cells dissolved in water. After metabolism, the waste products are carried away by water. If water intake is grossly neglected death can occur in as little as three to five days.

It is generally agreed that the average adult person should consume at least eight, 8 oz. glasses of water per day—more if the individual is undergoing stress that leads to increased loss of water. Unfortunately, most people drink water only when they feel parched. Generally, individuals do not consume sufficient water to completely address and/or reverse dehydration. Once dehydration begins the thirst response becomes even less effective as one ages. Older people are less likely to drink sufficient water and, hence, are more likely to suffer from dehydration. The reader's attention is drawn to "Problem: thirst, drinking behavior, and involuntary dehydration" by Dr. John E. Greenleaf, of NASA, (Medicine and Science in Sports and Exercise, 24:645 (1992)).

Our diets are replete with "empty" calories—refined foods loaded with fats and sugars—and contain few whole foods. When it comes to fiber many believe that a daily bowl of cereal is adequate. Our supermarkets and pantries are stuffed with brightly packaged, overly refined, prepared foods that are usually fiber-free or very low in fiber. The presence or absence of dietary fiber greatly influences one's ability to expel solid wastes. It has been estimated that about one in 19 individuals in our society has a health condition that requires special attention. In many cases this makes the need for adequate fiber and water, even more important to these individuals.

Fiber or "roughage" is a component of food that remains undigested as it passes through the gastrointestinal system. The vast majority of dietary fiber consists of polysaccharides of plant origin. The most obvious fiber is the cellulosic wall that surrounds plant cells. Many of these cells are actually called "fibers", hence the name "fiber" for this dietary component. However, there are actually two forms of fiber: insoluble fiber—the classic cellulosic material, and soluble fiber—water soluble polysaccharides that are not digested by human or carnivore digestive systems. Both types of fiber bind considerable water and, thus, have a softening effect on the stool. However, soluble fiber may, depending on the precise polysaccharides involved, be metabolized or partially metabolized directly by bacteria in the colon. Both type of fibers tend to increase motility within the gastrointestinal tract thus speeding transit time of wastes and lowering the risk of acute and chronic medical problems. Like water fiber is essential for human health and is not metabolized by humans.

It has been discovered that dietary fiber appears to moderate the rate at which sugars and fats are absorbed from the intestine. The exact reason for this effect is not completely understood. In the case of simple sugars, slowed absorption translates to a more gradual rise in blood sugar following eating. This is important in the managing of diabetes and may also help prevent adult onset diabetes. In the case of fats, the fiber seems to help prevent damaging levels of cholesterol in the blood. This seems to be due to a binding of bile salts and cholesterol to the fiber so that these materials are excreted with the feces rather than being absorbed or reabsorbed. Studies show adequate fiber clearly lowers the risk of heart disease and tends to bind toxins, including toxic metals, allowing them to exit safely from the digestive system.

Any water-soluble carbohydrate polymer can act as dietary fiber as long as no human enzymes are capable of hydrolyzing these polysaccharides into simple sugars. Preferentially, the polymers should also not be readily metabolized by bacteria common in the human gut so they can continue to provide a "bulking" effect. However, some types of soluble fiber are metabolized by and do promote growth of beneficial bacteria. This generally has a positive effect as the beneficial bacteria may also tend to lubricate the stool and prevent the growth of other bacteria that may release toxins (Leon Prosky, J. of AOAC Int'l. 82:223-35(1999)).

Soluble fiber comes from a wide range of plant sources. Water-soluble plant pectins and pectic materials, galactomannans, arabinogalactans and water-soluble hemicellulose can act as soluble fiber. Many plant "mucilages," gums, and soluble polysaccharides found in grains, seeds, or stems such as psyllium, guar, oat (beta glucans), astragalus (gum traganth), gum ghatti, gum karaya (Sterculia gum), and gum acacia are also soluble fiber. Algal polysaccharides such as agar or carrageenan also behave as soluble fiber as do other indigestible carbohydrates, such as maltodextrins or dextrins, produced by chemical or enzymatic digestion (e.g., partial hydrolysis) of starch, gums and other carbohydrate polymers. Soluble cellulosic ethers and other derivatives such as carboxymethyl cellulose behave as soluble fiber as do indigestible carbohydrate polymers artificially prepared using bacterial enzymes. Non-digestible storage carbohydrates such as inulin are also important soluble fibers. A number of companies are now providing an entire range of "soluble fiber" materials. For example, TIC Gums of Belcamp, Md., Novartis Nutrition of Minneapolis, Minn. and Imperial Sensus of Sugar Land, Tex. provide soluble fiber compounds of food grade.

Soluble "fiber" is known to provide a novel opportunity for improving the characteristics of fiber-poor refined foods. Fiber was removed from food products because in many cases it made the foods coarse, unpalatable or difficult to process. Adding insoluble bran or other similar fiber to foods may provide more roughage but can also degrade the favorable properties of the foods. For example, cakes or pastries made from flours high in insoluble fiber may have inferior taste and texture. Excess insoluble fiber may upset the digestion and lead to a number of digestive problems. On the other hand, soluble fiber is generally well tolerated, often improves the texture or other physical characteristics of the food product and is generally innocuous. Consequently, there are a growing number of food products, ranging from baked goods to "shake-like" beverages, contain added fiber in the form of soluble fiber. Soluble fiber can restore the benefits of fiber to our highly refined diet.

There are a number of "medical" or laxative products on the market that are based on soluble fiber. Various different brands are based on psyllium seed carbohydrates or on soluble cellulose derivatives (e.g. carboxymethyl cellulose). These products are replete with sugar, colors, dyes, artificial flavors, and artificial sweeteners. Generally, they do not comfortably fit into a "normal" diet. Usually they are powders that must be mixed with water to make a more or less thick, murky, slimy or even gritty solution.

SUMMARY OF THE INVENTION

It is an object of the present invention to simultaneously provide both essential water and essential dietary fiber.

It is another object to safely provide an optimal combination of water and fiber—two essential elements of human health.

It is another object of the present invention to provide fiber and safe water in a simple and pleasant to ingest convenient format.

The present invention discloses a water-like fluid that contains safe water and a significant quantity of soluble dietary fiber. The resulting solution, fiber-water is generally optically clear and has physical properties similar to potable water. Fiber-water can be used as a replacement for bottled or tap water as a means to ensure proper hydration. Depending on the soluble fiber used, fiber-water is either non-caloric or extremely low in calories. The amount of soluble fiber is adjusted so that consumption of an adequate amount of fluid to ensure hydration (eight 8 oz. glasses per day) will also provide an optimal amount of dietary fiber. This is particularly valuable in stressful situations where the diet may not provide adequate fiber without supplementation. The constant metered supply of fiber provided throughout the day may be preferable to the "bolus" administration of fiber. Too much fiber at one time can, in fact, actually have a detrimental effect on some gastrointestinal conditions. Additionally, the constant presence of soluble fiber in the digestive tract provides the known beneficial effects of moderating the postprandial increase in blood glucose, modulating serum lipid levels, and suppressing appetite.

The present invention, fiber-water, is prepared by dissolving any of a number of water-soluble polysaccharides in safe potable water. Either purified water or natural water (e.g. mineral water) can be used. However, because hydration is a major object of the invention, the base water should be relatively low in dissolved salts. Preferably the base water will not contain more than about 500 mg/l dissolved salts. This invention is intended to include any soluble fibers; however, at this time, the most preferred soluble fibers are derived from polysaccharides. Especially preferred polysaccharides are refined dextrins or maltodextrins produced by hydrolysis of starch (e.g., corn or potato starch), purified inulins (fructo-oligosaccharides) produced from plants such as dahlia or chicory, and partially hydrolyzed or otherwise fractionated vegetable gums such as partially hydrolyzed guar gum. A single type or mixture of more than one soluble fiber can be used to formulate fiber-water.

One way of using the invention is to provide the proper daily requirement of fiber spread over the eight 8 oz. glasses of water recommended to insure proper hydration. The invention is also useful to provide fiber and water in enteral feeding situations and to provide fiber to children and infants. In some applications color may be added as an indicator of the amount of fiber present because different strengths of the fiber solution are contemplated. In other situations color can be added to provide a more desirable appearance. The material can be consumed directly or can be used in any food to which water must be added. It is also contemplated that the invention can be used to ensure hydration and regularity of domestic animals—primarily cats and dogs. However, any carnivore or omnivore should benefit from the invention. Herbivores have very different gut bacteria and may be able to metabolize the soluble fiber. Therefore, these animals must be tested on a case-by-case basis.

DETAILED DESCRIPTION OF THE PREFERRED EMBODIMENTS

The current trend in foods is to add fiber to a variety of food products. There are, however, potential drawbacks to this trend. To be fully effective soluble fiber must be combined with an adequate intake of water—certainly not available in dry goods and baked goods. This is true for both soluble and insoluble fiber. Although the "shake-like" and other soluble fiber beverages or mixes to which water must be added do contribute water, they, like most dry goods, also contribute a significant source of calories to the diet—a major problem with today's diets and something clearly not needed by our generally overfed population. While it is possible to limit the caloric content of the fiber-containing beverages through the use of non-nutritive sweeteners, this amounts to adding chemicals that may create or exacerbate health problems. Therefore, the present inventor has developed a superior solution based on the unique synergistic interaction between water and soluble fiber.

In experimenting with various types of soluble fiber, the inventor noticed that a number of the more refined materials, such as lower molecular weight grades of inulin (for example see U.S. Pat. No. 5,968,365), specialized dextrins, maltodextrins and partially hydrolyzed guar gums can actually produce a clear, or virtually clear, and virtually colorless solution in water. Further, these soluble fibers are essentially tasteless at the preferred concentrations for consumption and essentially non-metabolized by the human digestive tract. Thus is produced an entire new class of beverage-namely, "fiber-water." Dissolving appropriate water-soluble fiber to a concentration of generally 0.1-10% (by weight) produces fiber-water. The resulting product is essentially water-like. Any of the soluble fiber materials listed above can used individually or combined so long as the resulting product has the desired "water-like" characteristics, namely little or no taste, water-like viscosity, and few or no calories. Some of the carbohydrate polymers may contain small amounts of material that is absorbed and does contribute calories to human metabolism. However, the number of calories is small compared to the significant dietary fiber contributed and can be minimized by careful selection and blending of different soluble fiber materials. Furthermore, there are individuals and or species that are unable to absorb any of the soluble fiber and so that no calories are added.

Fiber-water is the perfect addition to the modern human diet as well as that of appropriate animals. It adds few, if any, calories and is readily substituted for bottled water as a safe source of hydration. In the intestines, water is withdrawn from the intestinal contents, and as the effective concentration of soluble fiber increases, the viscosity-increasing and sequestering properties of the soluble fiber result in slowed absorption of sugars and altered absorption of fats. This is of major significance in diabetes, heart disease, and equally significant additional health conditions. Ultimately in the colon the hydrophilic properties of the soluble fiber have a softening and bulking effect on the stool. Thus, fiber-water is a unique, consistent, safe, easy to use single product that simultaneously ameliorates the problems of dehydration and constipation. Further, there are indications that the viscosity enhancing and carbohydrate absorption-slowing properties of the soluble fiber result in appetite suppression both by creating a feeling of fullness and by moderating swings in blood sugar. Scientific as well as popular literature is filled with positive effects of fiber on weight control both in humans and domestic animals. Thus, fiber-water is not only non-caloric or very low in calories but has additional positive effects on weight control.

Although the inventor contemplates fiber-water as a direct way to add water and fiber to the diet, it is also a feature of the invention that it can also be used to add fiber to other foods. For example, any packaged food or beverage can be reconstituted with fiber-water to yield a fiber-enhanced food and/or beverage. Because fiber-water is based on safe water, it results in a safe food product even if the product is not heated to destroy microbes, although soluble fiber polysaccharides are generally stable during the cooking process. This means that if fiber-water is used to cook foods, such as grains (rice), oatmeal, and legumes, that imbibe water during the cooking process, these foods will also become fiber enhanced. Further, if dried or concentrated fruits, vegetables, etc. are soaked in fiber-water, they will become fiber-enriched as well as softened and more digestible due to the absorption of water. Fiber can readily be added to all types of packaged food including gelatin products and to canned concentrated foods such as soups. Further, since fiber-water is heat stable it can be used to prepare fiber enriched hot beverages. In addition, fiber-water can be frozen to provide fiber-water-based ice cubes, crushed ice, pops, etc.

An important aspect of fiber-water is that it preferably has a "water-like" appearance. By this the inventor means that the solution is essentially clear. People tend to relate clear solutions to purity. Some soluble fiber materials yield a cloudy or murky solution. It is preferred that fiber-water utilize materials that yield essentially clear solutions. As already mentioned, several available non-digestible carbohydrates produce "water clear" solutions. Generally partial hydrolysis or fractionation of the soluble fiber materials already discussed (e.g. partially hydrolyzed guar gum) will lead to clearer solutions. To date many manufacturers of soluble fibers have been concerned with using their products in solid foods where texture of the ingredient is most important. Therefore, there has been little effort in producing materials that make clear solutions. Additionally; there has been no effort to combine "water clear" soluble fiber with safe water to create fiber-water.

Numerous and varied medical conditions, both short term and long term, may require feeding an individual through a tube. The two types of tubes used most commonly are the naso-gastric tube and the gastrostomy tube. In either case nutriment is supplied directly into the stomach. The present inventor is a named inventor on U.S. Pat. Nos. 4,315,513 and 4,393,873 for a percutaneous transport tube with a one-way valve for gastric feeding, and is an expert on the subject of conditions and problems related to tube feeding.

Great efforts have been made by major corporations to provide balanced nutritional formulations for specific medical conditions to be used for tube feeding. Depending on the specific medical condition, the severity of the problem, and a moment in time, constipation may present serious additional medical problems. One of the major shortcomings of commercial premixed products is that they do not readily contain enough fiber. There are continuing on going efforts to create tube feeding formulas that will address this problem. As an example Novartis Nutrition has created IMPACT with Fiber. This product contains 250 calories per 250-ml can and only 2.5 mg of fiber. Also, liquid foods capable of passing through a tube are frequently high in calories and low in fiber. Patients who are on tube feedings usually do not get the optimal amount of physical activities. Such activity is important in stimulating proper functioning of the digestive tract. Therefore one can certainly surmise the additional importance of fiber in the diets of these individuals. The inventor also notes that some patients may have a high requirement for fiber whereas others do not. Therefore, one may administer excess calories in an attempt to provide adequate fiber. While it is known that water can be administered through feeding tubes it has been virtually impossible to administer adequate fiber. To that end patients receive far to many suppositories, enemas, and colonics. In addition, far too many chemically based laxative products are delivered through these tubes are.

Depending on the design of the particular tube, it may be expected that the viscosity of the feeding liquid may be a problem. With the consideration that her inventions possess a one-way valve it is far more difficult to use a viscous product than with the conventional latex tubes which have the additional options of using gravity flow techniques. Additionally, one must take into serious consideration the fact that nasal-gastric fed patients are more sensitive to being fed continuously, and or more frequently by the tube. Problem also may occur when the formulation is more viscous. This is especially true in traumatized and overly sensitive patients. Extensive feedings through these tubes may often irritate the throat. This has been addressed and taken most seriously by the inventor.

Whether it is for hospital, home, or travel like situations the ultimate solution for tube fed patients is to supplement the feeding regime with fiber-water rather than just plain water. Fiber-water, as described herein, is simple and accurate to administer. The fiber-water can be used as a stand-alone product or mixed with a given formula before delivering it to the patient as a single unit. Further, fiber-water can be added to the tube line in tandem with other supplementation (see U.S. Pat. No. 5,531,734 "Method of Altering Composition of Nutritional Product During Enteral Tube Feeding" and U.S. Pat. No. 5,533,973 "Alteration of Nutritional Product During Enteral Tube Feeding"). The inventor contemplates fiber-water in a number of different grades—that is with different quantities of fiber. The inventor further contemplates fiber-water, which is additionally a combination of safe water and one or more soluble as specific health conditions dictate. In this way both the type and strength can be selected that will provide the optimum amount of desired fiber to a given patient when the type and or quantity administered is adjusted to meet the patient's needs. It is further contemplated that the strengths and types could each be uniquely indicated by a safe soluble food-grade color so that hospital personnel, other caregivers, or even the patient himself could readily recognize which grade of fiber-water was being administered. This would further ensure that the correct grade was used for a particular patient. Color has often been denoted to coincide with flavor. Thus, to a tube fed patient this addition of color might be pleasing, especially to a child patient, and provide a distraction from an unpleasant situation. Further, since these tubes are not always permanent, and if the fiber-water experience accomplishes the designed intent, and is both convenient and pleasant the inventor is hopeful that on going use of fiber-water will continue on a regular basis. The value of fiber-water will be carried forward to promote good health for life.

Although the above discussion presupposes that the primary user of fiber-water would be an adult (over 21 years of age), infants, children and teens, as well, have significant fiber requirements. The young people, as well as adults are victims of the American diet, which is notoriously deficient in fiber rich fruits and vegetables. Children can benefit from optimal hydration based on fiber-water. By helping control appetite we now may have discovered a way to address and control childhood and adult obesity as disclosed in U.S. Pat. No. 5,505,981 "Method for Imparting Ability of Preventing Obesity and Imparting Glucose Tolerance to Foods and Sugar Preparations Exhibiting Such Preventative Effects".

Critically important may be the effect of fiber-water on both type one, type two (adult onset and juvenile) and or borderline diabetics as disclosed in U.S. Pat. No. 5,344,824 "Method for Reducing Insulin Secretion".

At every stage of life, fiber is vital to proper health, growth and development. Infants and toddlers require a regular and controlled source of fiber. After babies cease to breast-feed or use liquid formulas and move on to more varied "adult" solid foods, they often suffer a number of painful digestive episodes which makes them fussy and difficult. Because fiber-water provides an ideal source of hydration and fiber for such infants, it may be added to commercial formulas or used alone. Therefore, not only does it ensure adequate hydration, it also provides a consistent fiber source to guarantee regularity. It should be kept in mind that typical commercial baby foods may vary widely in the amount of fiber provided. Fiber-water provides an opportunity to lay the foundation of good habits of hydration and fiber intake. Additionally, it may be beneficial to add fiber-water to commercial baby food if a thinner consistency is desired.

Domestic animals, particularly cats and dogs, also suffer from problems with hydration and constipation. Dogs are omnivorous and will naturally consume some fruits and vegetables. However, refined dog foods tend to be remarkably deficient in vegetable fiber. Administering a source of fiber-water daily since dogs generally drink offered water can readily alleviate this problem. An alternative is to add the fiber water to dry kibble (or as an example, the "gravy" forming type) or even stirred into canned dog food. Because fiber-water is essentially flavorless, tests have shown that it has gone unnoticed by dogs, cats, and other animals. Cats also have serious dehydration and constipation problems. In the wild, cats ingest sufficient indigestible matter (bones, cartilage and tendons) to provide non-vegetable "fiber." With pet cats the owners are expected to mix fiber (generally psyllium) with the cat's food or administer petroleum-based laxatives. Neither alternative is particularly ideal. Fiber-water can be given as water or mixed with the cat's food to provide sufficient fiber to prevent both hairballs and constipation thus solving significant feline problems.

EXAMPLE 1

It has been estimated that adult fiber requirements are between about 10 grams and about 40 grams per day. Some experts have adopted a figure of around 25 grams. Obviously, the requirement for fiber is related to body size, weight and health status. Some attempts have been made to relate the requirement to weight. It has been estimated that between 50 and 300 mg. of fiber per kilogram of body weight per day. Fiber requirements can also be estimated from daily caloric intake. Current estimates call for about 25 grams per day for a 2,000-calorie diet (adequate for a 125 pound person) and about 37 grams for a 3,000-calorie diet (adequate for a 175 pound person). Both approaches yield roughly similar results since a heavier person usually has a greater caloric intake. These estimates should provide adequate fiber for even a person with a very fiber deficient diet.

To meet a 25 g of fiber per day requirement (with fiber-water being the sole fiber source as an example only) and using the rubric of 8 glasses of water (each glass equals approximately 250 ml of water) one should spread the 25 g over 2,000 ml (8.times.250 ml). Therefore, the fiber-water used should contain 12.5 mg/ml of soluble fiber or approximately 1.25% by weight fiber-water. For a daily caloric intake of 3,000 calories this translates to a fiber-water of about 2% by weight soluble fiber.

This analysis indicates that no fewer than two different "strengths" of fiber-water should be produced to allow a range of average persons receive both the optimum amount of water and fiber. In actual fact, it is convenient to produce a number of strengths (grades), for example, ranging from about 0.50% to 2.5%. This would allow a wide range of individuals to readily select a fiber-water strength that simultaneously supplies both the required amount of water and the required amount of fiber. For individuals who are not under constant medical monitoring the ingestion of fiber-water can be uniquely adapted to conform to ones lifestyle without compromising effectiveness and on an individual basis. Depending on individual needs and the desire to drink in relation to ability to drink the amount of fiber can be increased by using an appropriate "strength" of fiber-water to supply some or all of the required eight glasses of water. Of course, it is also possible that an individual is not able, nor does not intend, to spread out the fiber requirement over eight 8 oz. glasses throughout the day. Individuals do differ as to their specific habits, preferences, and do prefer to be in control of their choices. To that end for some it may be preferred to consume fiber-water at home—in the morning, evening, and or both—and not at work or throughout one's daily activities. For this and similar reasons, it is desirable to make multiple concentrated strengths (grades) of fiber-water ranging from 5% to even 10% by weight of fiber to reduce the number of daily doses needed and or desired. Thus, if one does not have fiber-water available all day, hydration can be assured by drinking plain safe water supplemented by a higher "grade" of fiber-water to reach the fiber requirement as described above. If necessary, the amount of fiber consumed can be reduced by using a lower "grade" of fiber-water, or even just plain safe water, for some of the daily-required eight glasses of water. It may also be advantageous to add a different food color to each grade so that the "strength" of the fiber-water can be identified at a glance. Colors can be used to indicate different strengths of fiber in the water, or color can be use to attract and or enhance desirability.

Fiber-water for testing according to the above scheme was produced by dissolving the required weights of a mixture of indigestible dextrins and partially hydrolyzed guar gum in purified water. The preferred dextrins or maltodextrins are prepared by controlled hydrolysis of vegetable starches (e.g. potato or corn) as is described in U.S. Pat. No. 5,620,873. The hydrolyzed guar gum is of the type discussed in U.S. Pat. No. 5,260,279 (available in the United States as BENEFIBER®. from Novartis Nutrition of Minneapolis, Minn.; available in other countries as SUN-FIBER®. from Taiyo of Japan). The resulting solution, in the strengths explained above, is essentially colorless and clear having the basic appearance of plain water. The liquid is either flavorless or may have a very slight "sweetness" depending on the strength of the particular solution and the proportion of the soluble fibers used. The partially hydrolyzed guar gum is essentially flavorless while the maltodextrin has a slight sweet taste. In addition, some individuals can detect a slightly different "mouth feel" because of the slight viscosity increase resulting from the soluble fibers.

However, for all practical purposes the resulting solution looks and behaves like bottled water and can readily be used in place of bottled water. If it is desired to ensure the microbial status of the fiber-water, it can be autoclaved or sterile filtered like plain water. Starting with a good quality drinking water preferably one with little or no sodium can ensure a safe and palatable product. Sodium-free safe water would be preferable to meet the standards of the Heart Association. Under the FDA regulations as long as one does not exceed one percent of the final product we can provide the addition of trace "essence" or flavor such as cherry, orange, grape, lime or lemon which can enhance palatability without adding any calories or otherwise detracting from the beneficial properties of the product. Without the approved additives fiber-water should look, behave and be used like high quality drinking water. To this end any "naturally occurring" water can be used as a starting. Thus, it is possible to start with a natural mineral water and produce "fiber mineral water." Such mineral waters are defined as bottled water containing not less than 250 parts per million total dissolved solids.

EXAMPLE 2

Infants also have distinct fiber requirements. Until recently, no specific guidelines for dietary fiber in children were available. Recommendations have recently been developed, based on age, weight and height of the child. It is now recommended that children older than two years consume a minimum amount of fiber equal to the age plus five grams a day. The recommended "safe dose" is between this and age plus ten grams a day.

A useful amount of soluble fiber is ¼-1 gram per 8 oz (considerably lower concentration than for the adult fiber-water). The "baby fiber-water" is produced by dissolving the required amount of soluble fiber consisting of a mixture of partially hydrolyzed guar gum and inulin (FRUTAFIT®. from Imperial-Sensus of Sugar Land, Tex. is a preferred inulin for this purpose) in safe (e.g., purified) water. The slight sweetness of the inulin makes the water especially palatable. The intent here is not to treat any specific diseases but to ameliorate constipation—and thus disease states known to cause constipation.

Water probably can be given as early as one month, although usually started between 2-4 months after birth. Several commercial companies including GERBER and BEACH-NUT have bottled "baby water". Using safe packaged fiber-water is even better where it is desired to avoid excessive caloric intake. In the case of the "fat baby" the fiber-water may well do more than provide a low or non caloric-hydrating agent. The soluble fiber in fiber-water has been show to slow the absorption of fats and sugars (see U.S. Pat. No. 5,505,981). Therefore, the fiber-water may also help to counteract an overly rich diet.

While fiber-water may be packaged in any container and under the conditions designated by governmental health standards the inventor considers the packaging of fiber-water for children, especially young children, to be packaged in flexible pouches or laminate boxes for several reasons, including the dangers of glass containers, or the "less likely to spill" of a wide mouth cup. As with adult fiber-water, it is advantageous to provide the infant and child fiber-water in a number of "strengths" so that the amount of fiber administered can be readily monitored and appropriately adjusted on an individual basis. Again, it may be advantageous to add identifying color so that it is clear to the parent precisely which grade of fiber-water is being used. In the case of children the color is inherently appealing and may mitigate in favor of using transparent packaging so that the child can appreciate the color of the fiber-water being consumed. It is also conceivable that if the container is not transparent that a transparent straw may show the color, or that specific graphics or color on the container will relate to the strength (apart from the aesthetic appeal of the color or graphics).

It is permissible and often advantageous to blend an assortment of different soluble fibers to create any particular fiber-water. It is believed that the various soluble fibers have essentially identical properties when it comes to providing bulk and hydration to the stools. However, it is not yet clear which soluble fibers will prove superior in altering lipid or sugar absorption, etc. Of the soluble fibers presently available the indigestible dextrins, inulins and partially hydrolyzed guar gum appear to provide the most "water clear" solutions. However, many dextrins and inulins contain a small amount of a metabolizable component and have a slight sweet taste. Therefore, there can be an advantage of providing a portion of the soluble fiber in the form hydrolyzed guar gum or some other flavorless and totally non-metabolizable compound. Even though some of these materials may produce a less clear solution, a combination with a "clear" soluble fiber can yield a solution that is both high in fiber and clarity and low in sweetness or other taste. Other soluble fibers can be combined to realize the advantages of the different fibers. Inulins have a slightly sweet taste and while not appreciably metabolized by humans, bacteria in the colon metabolize inulins. In some cases such colonic metabolism may provide a distinct advantage and would mitigate towards including inulins in the mixture. Until the advent of fiber-water the advantage of a clear or nearly clear soluble fiber was not appreciated.

As mentioned above, it is anticipated that partial hydrolysis and fractional refining of the various soluble fibers mentioned above will rapidly lead to a greater variety of "water clear" soluble fibers.

The present invention discloses the hitherto unappreciated advantages of using fiber-water as an essentially non-caloric source of fiber and water. In other words a new dietary component that simultaneously provides hydration and dietary fiber. While the examples have dwelt with prepackaged, ready to drink fiber-water, there is nothing that precludes fiber-water from being prepared by the end user from a concentrated ready mixed source of soluble fiber, potable water and or with the additions of flavor and essences under FDA regulations. The soluble fiber can be in the form of a powder, slurry or suspension or a concentrated solution or syrup to which a predetermined quantity of water is added. In the past such fiber sources have been added to solid food items and to various beverages. However, such concentrated sources of fiber have never been used to prepare potable fiber-water for direct consumption as water Fiber water can be made from any water so long as it is safe to drink. Fiber water can be made right before consumption, or packaged in ready-to-drink or for tube feeding. In addition, the fiber water product may have various strengths or be sold in concentrated form for reconstitution or dilution. Several approaches can be taken to extend the shelf life of the fiber water products. This inventor's earlier U.S. Pat. No. 6,248, 390 suggested autoclaving or sterile-filtering fiber water.

One approach to extending the shelf life is adding an acidulate (an acidic substance). This inventor's earlier patent described fiber water that is essentially free of organic acids. However, some mineral carbonated water is naturally acidic. The pH level of still water is usually between 6.8 and 7.8, while carbonated waters have a pH of 4.2-4.8. The pH of still water may be lowered with the acidulate. The low pH would inhibit the growth of most pathogenic microorganisms that cause food poisoning.

Another intention of using an acidulate is improving the taste profile of the fiber water composition, as it balances the flavor of the water. The flavor depends on the source of the water, its mineral content and the purifying technologies. Some consumers have equated a slightly acidic taste with cleanness and freshness. In fact, it has been demonstrated that consumers generally prefer more acidic foods and drinks.

An acidulate is an acidic substance used as a food additive in order to control the pH. The acceptable pH that inhibits bacterial growth is considered to be below 4.5. Often acidulates include organic acids, such as citric, acetic, fumaric, ascorbic, lactic, malic and sorbic. However, organic acids are weak acids. This means that a larger amount of acid must be added to achieve the desired shift in pH. The large amount of acid often imparts an undesirable flavor or taste to the product. This may be acceptable in a food or a beverage that provides its own flavor or sweetener that masks the flavor of the acidulate. However, the change in flavor and taste are incompatible with the main characteristic of fiber-water used for drinking—it must taste, feel, look and smell like pure fresh water.

An acidulate can also include inorganic acids. Inorganic acids such as phosphoric, hydrochloric and sulfuric, unlike organic acids, are strong and must be added in much smaller amounts. Most inorganic acids are corrosive and difficult to handle. Furthermore, a strong acid will cause an immediate local drop in pH upon addition and likely cause hydrolysis of the glycosidic bonds in the fiber molecules. This is undesirable because the shorter the carbohydrate chain, the less the bulking effect of the fiber molecule. For example, inulin starts degrading when pH drops below 3.7. This effect will become even more severe at higher temperatures that enhance acid hydrolysis.

The hydrolysis at low pH may be of concern if the fiber solution is made as a concentrate for later dilution by the manufacturer or the end-user. The commercial concentrates are often 14 to 15-fold concentrated. One should take care that the pH of such concentrate does not drop to the level where hydrolysis occurs.

Therefore, generally, a suitable acidulate would have intermediate acidic strength. Acidic strength is expressed as pKa (a negative log of the acid dissociation constant). As shown in table 1, the pKa values of strong acids are negative, while those of weak acids are positive. Accordingly, the desired acidulate for use in fiber-water would have a pKa value falling approximately in the range between 0 and 4.

TABLE 1

| Acid | pKa |
|---|---|
| Sulfuric | −10 |
| Hydrochloric | −7 |
| Phosphoric | 2.1 |
| Citric | 3.1 |
| Lactic | 3.1 |
| Malic | 3.4 |
| Fumaric | 3.8 |
| Acetic | 4.8 |

One example of an acceptable acidulate is bisulfate disclosed in the U.S. Pat. Nos. 5,958,491 and 6,620,445 to Knueven. The patents describe successful use of sodium and potassium bisulfates in solid foods as well as beverages. This acidulate did not hydrolyze the fiber components present in the foods such as pectin and plant gums. The bisulfate compounds ($NaHSO_4$, CAS Reg. No. 7681-38-1 and $KHSO_4$, CAS Reg. No. 7646-93-7) are manufactured by Jones-Hamilton Co. of 30354 Tracy Rd., Walbridge, Ohio 43465. The products are about 93% pure and have been designated by the FDA as GRAS (Generally Recognized As Safe) for use as food acidulates. Notably, sodium, potassium and other alkaline metal bisulfates are not acids, but salts of an acid. The acidic agent is the resulting ion ($HSO_4^-$). Its pKa is 1.9. This pKa value falls exactly in the desired range between 0 and 3. To achieve the pH of 4.5, one generally needs to add about 0.01% (100 mg/l) of bisulfate to the pure water. While the bisulfates are described in detail, they are merely one example of acceptable inorganic acidulates.

In general, the acidulate may be made of one or more acids as long as the resulting pH falls within the desired range. Furthermore, the acidulate may be a mixture of organic and inorganic acids as long as the components can co-exist in solution without degradation.

It is also noted, that fiber water can contain beneficial minerals and other inorganic substances, while still falling below the threshold of 500 mg/L of dissolved solids.

For example, the bisulfate used as acidulate can be a source of inorganic sulfur. Recent studies have shown that dietary inorganic sulfur is essential for bone and cartilage maintenance because it promotes the synthesis of sulfur-containing compounds such as methionine, S-adenosyl methionine (SAMe) and chondroitin sulfate. These studies suggest ingesting water with 500 mg/L of inorganic sulfate.

Metals can also be added to fiber water. If an entire RDA is spread over the eight 8 oz. glasses of water drank during the course of the say, the amount of salts would still fall below the 500 mg/l threshold. For example, 100% RDA of iron is 18 mg. When added as iron fumarate, this dose translates into 45 mg/day. Similarly, 100% RDA for magnesium is 400 mg, or 667 mg of magnesium oxide per day. While there is no RDA for fluorine, it is well accepted in the medical community that fluorine (fluoride ion) in the drinking water is essential for the strength of the tooth enamel. The protective effect in children occurs with consumption of 2.5 mg/day and in adults at 1.5 mg/day. When used as sodium fluoride, this dose will translate to 6 and 10 mg per day respectively. Chromium, important for proper insulin function, may be added as chromium chloride or picolinate. The RDA for chromium is 120 mcg. If added as chloride, this translates into 200 mcg per day and as picolinate—to 1 mg per day. The RDA for zinc is 15 mg. Zinc, when added as zinc oxide, will require 19 mg per day. The RDA for iodine is 150 mcg. Iodine, when added as potassium iodide, will require 146 mcg per day.

When added together or separately at their respective RDA amounts, these minerals will not exceed the 500 mg/l threshold of dissolved solids in fiber water.

The present invention discloses a composition, fiber-water, useful as an essentially non-caloric source of both dietary fiber and drinking water. While the invention is described in connection with the examples, it is understood that the examples are not intended to be limiting. On the contrary, it is contemplated that alternative modifications and equivalents be included in the scope of the invention as defined by the appended claims.

I claim:

1. A water composition consisting essentially of: safe water;
   one or more water-soluble indigestible fibers selected from a group consisting of inulin, dextrin, maltodextrin and partial hydrolyzates of the fibers from said group, where total fiber constitutes at least 1% by weight of said composition; and between 0.005 and 0.015% of an acidulate, forming a solution whose physical properties are similar to potable water.

2. The water composition of claim 1 wherein said acidulate is sufficient to lower the pH of said water composition to no greater than 5.0.

3. The water composition of claim 2 wherein said acidulate is at least one compound selected from a group consisting of sodium bisulfate, potassium bisulfate, citric acid, acetic acid, fumaric acid, ascorbic acid, lactic acid, malic acid, and sorbic acid.

4. The water composition of claim 3 wherein the acidulate is a combination of sodium bisulfate or potassium bisulfate, and citric acid.

5. The water composition of claim 3 wherein the acidulate is a combination of sodium bisulfate or potassium bisulfate, and malic acid.

6. The water composition of claim 1 wherein said acidulate has an acid dissociation constant (pKa) value between 0 and 4.

7. The water composition of claim 1, wherein said composition contains fewer than 500 mg/L of soluble salts.

8. The water composition of claim 7, wherein said salts comprise minerals.

9. The water composition of claim 8, wherein the water-soluble indigestible fiber is inulin or partial hydrolyzates thereof.

10. The water composition of claim 8, wherein said minerals are selected from a group consisting of calcium, iron, phosphorus, magnesium, zinc, copper, manganese, chromium, and fluorine.

11. The water composition of claim 10, wherein said minerals comprise iron, chromium, or fluorine.

12. The water composition of claim 1, wherein the water-soluble indigestible fiber is inulin or partial hydrolyzates thereof.

13. The water composition of claim 1, wherein the water-soluble indigestible fiber is a mixture of inulin and dextrin or maltodextrin, or partial hydrolyzates thereof.

14. The water composition of claim 1, wherein the acidulate is an inorganic acid.

15. The water composition of claim 14, wherein the acidulate is sodium bisulfate or potassium bisulfate.

16. The water composition of claim 1, wherein fewer than 10 calories per 100 ml are metabolized by a human when consuming the water composition.

17. The water composition of claim 1, wherein said composition forms an optically clear solution.

* * * * *